US 8,689,145 B2

(12) United States Patent
Kerr et al.

(10) Patent No.: US 8,689,145 B2
(45) Date of Patent: Apr. 1, 2014

(54) 3D REMOTE CONTROL SYSTEM EMPLOYING ABSOLUTE AND RELATIVE POSITION DETECTION

(71) Applicant: Apple Inc., Cupertino, CA (US)

(72) Inventors: Duncan Robert Kerr, San Francisco, CA (US); Chad Bronstein, Sunnyvale, CA (US); Wing Kong Low, Sunnyvale, CA (US); Nicholas Vincent King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/647,088

(22) Filed: Oct. 8, 2012

(65) Prior Publication Data

US 2013/0027297 A1 Jan. 31, 2013

Related U.S. Application Data

(63) Continuation of application No. 11/594,342, filed on Nov. 7, 2006, now Pat. No. 8,291,346.

(51) Int. Cl.
*G06F 3/048* (2013.01)

(52) U.S. Cl.
USPC .......................................... 715/856; 345/158

(58) Field of Classification Search
USPC .......................................................... 715/856
See application file for complete search history.

(56) References Cited

U.S. PATENT DOCUMENTS

| | | | |
|---|---|---|---|
| 4,229,009 A | 10/1980 | Ohta | |
| 4,395,045 A | 7/1983 | Baer | |
| 4,813,682 A | 3/1989 | Okada | |
| 5,115,230 A | 5/1992 | Smoot | |
| 5,302,968 A | 4/1994 | Heberle | |
| 5,467,288 A | 11/1995 | Fasciano et al. | |
| 5,502,459 A | 3/1996 | Marshall et al. | |
| 5,504,501 A | 4/1996 | Hauck et al. | |
| 5,515,079 A | 5/1996 | Hauck et al. | |
| 5,554,980 A | 9/1996 | Hashimoto et al. | |

(Continued)

FOREIGN PATENT DOCUMENTS

| | | |
|---|---|---|
| CN | 1877506 | 12/2006 |
| WO | 2004057454 | 7/2004 |
| WO | 2007060287 | 5/2007 |

OTHER PUBLICATIONS

U.S. Appl. No. 60/967,835, filed Sep. 7, 2007.

(Continued)

*Primary Examiner* — Enrique Iturralde
(74) *Attorney, Agent, or Firm* — Van Court & Aldridge LLP (57) ABSTRACT

The present invention can include three-dimensional remote control systems that can detect an absolute location to which a remote control is pointing in first and second orthogonal axes and an absolute position of the remote control in a third orthogonal axis. Remote control systems of the present invention can employ absolute position detection with relative position detection. Absolute position detection can indicate an initial absolute position of the remote control and relative position detection can indicate changes in the position of the remote control. By combining absolute and relative position detection, remote control systems of the present invention can track remote controls more precisely than systems that only employ absolute position detection. The present invention also can include methods and apparatus for zooming in and out of an image shown on a display based on the absolute position of the remote control in the third axis.

20 Claims, 8 Drawing Sheets

(56) References Cited

U.S. PATENT DOCUMENTS

| | | | |
|---|---|---|---|
| 5,703,623 A * | 12/1997 | Hall et al. ............ | 345/158 |
| 5,736,975 A | 4/1998 | Lunetta | |
| 5,892,501 A | 4/1999 | Kim et al. | |
| 5,926,168 A | 7/1999 | Fan | |
| 6,130,662 A | 10/2000 | Umeda | |
| 6,146,278 A | 11/2000 | Kobayashi | |
| 6,171,190 B1 | 1/2001 | Thanasack et al. | |
| 6,184,863 B1 | 2/2001 | Sibert et al. | |
| 6,184,884 B1 | 2/2001 | Nagahara et al. | |
| 6,252,720 B1 | 6/2001 | Haseltine | |
| 6,287,198 B1 | 9/2001 | McCauley | |
| 6,331,848 B1 | 12/2001 | Stove et al. | |
| 6,377,242 B1 | 4/2002 | Sweed | |
| 6,476,797 B1 | 11/2002 | Kurihara et al. | |
| 6,538,665 B2 | 3/2003 | Crow et al. | |
| 6,618,076 B1 | 9/2003 | Sukthankar et al. | |
| 6,650,822 B1 | 11/2003 | Zhou | |
| 6,683,628 B1 | 1/2004 | Nakagawa et al. | |
| 6,727,885 B1 | 4/2004 | Ishino et al. | |
| 6,765,555 B2 | 7/2004 | Wu | |
| 7,024,228 B2 | 4/2006 | Komsi et al. | |
| 7,030,856 B2 * | 4/2006 | Dawson et al. ............ | 345/158 |
| 7,053,932 B2 | 5/2006 | Lin et al. | |
| 7,102,616 B1 * | 9/2006 | Sleator ............ | 345/158 |
| 7,165,227 B2 | 1/2007 | Ubillos | |
| 7,219,308 B2 | 5/2007 | Novak et al. | |
| 7,302,181 B2 | 11/2007 | Ng et al. | |
| 7,458,025 B2 | 11/2008 | Crow et al. | |
| 7,496,277 B2 | 2/2009 | Ackley et al. | |
| 7,627,139 B2 | 12/2009 | Marks et al. | |
| 7,705,799 B2 | 4/2010 | Niwa | |
| 7,728,823 B2 | 6/2010 | Lyon et al. | |
| 7,954,065 B2 | 5/2011 | Ubillos | |
| 7,984,385 B2 | 7/2011 | Ubillos | |
| 2001/0002830 A1 | 6/2001 | Rahn et al. | |
| 2001/0050672 A1 | 12/2001 | Kobayashi | |
| 2002/0045960 A1 | 4/2002 | Phillips et al. | |
| 2003/0050092 A1 | 3/2003 | Yun | |
| 2003/0076301 A1 | 4/2003 | Tsuk et al. | |
| 2003/0095096 A1 | 5/2003 | Robbin et al. | |
| 2003/0201984 A1 | 10/2003 | Falvo | |
| 2003/0210286 A1 | 11/2003 | Gerpheide et al. | |
| 2004/0070564 A1 * | 4/2004 | Dawson et al. ............ | 345/156 |
| 2004/0095317 A1 * | 5/2004 | Zhang et al. ............ | 345/158 |
| 2004/0105264 A1 | 6/2004 | Spero et al. | |
| 2004/0207597 A1 | 10/2004 | Marks | |
| 2004/0218104 A1 | 11/2004 | Smith et al. | |
| 2004/0261037 A1 | 12/2004 | Ording et al. | |
| 2005/0012723 A1 | 1/2005 | Pallakoff | |
| 2005/0055624 A1 | 3/2005 | Seeman et al. | |
| 2005/0174324 A1 * | 8/2005 | Liberty et al. ............ | 345/156 |
| 2005/0210417 A1 * | 9/2005 | Marvit et al. ............ | 715/863 |
| 2005/0210418 A1 * | 9/2005 | Marvit et al. ............ | 715/863 |
| 2005/0212749 A1 | 9/2005 | Marvit et al. | |
| 2005/0212766 A1 | 9/2005 | Reinhardt et al. | |
| 2006/0026521 A1 | 2/2006 | Hotelling et al. | |
| 2006/0026535 A1 | 2/2006 | Hotelling et al. | |
| 2006/0123360 A1 | 6/2006 | Anwar et al. | |
| 2006/0152487 A1 | 7/2006 | Grunnet-Jepsen et al. | |
| 2006/0152488 A1 | 7/2006 | Salsman et al. | |
| 2006/0152489 A1 * | 7/2006 | Sweetser et al. ............ | 345/158 |
| 2006/0170874 A1 | 8/2006 | Yumiki et al. | |
| 2006/0184966 A1 | 8/2006 | Hunleth et al. | |
| 2006/0262105 A1 | 11/2006 | Smith et al. | |
| 2006/0277571 A1 | 12/2006 | Marks et al. | |
| 2006/0284841 A1 | 12/2006 | Hong et al. | |
| 2007/0067798 A1 | 3/2007 | Wroblewski | |
| 2007/0109324 A1 | 5/2007 | Lin | |
| 2007/0132725 A1 * | 6/2007 | Kitaura ............ | 345/156 |
| 2008/0106517 A1 | 5/2008 | Kerr et al. | |
| 2008/0235617 A1 | 9/2008 | Kim et al. | |
| 2010/0058220 A1 | 3/2010 | Carpenter | |
| 2010/0303440 A1 | 12/2010 | Lin et al. | |
| 2011/0035700 A1 | 2/2011 | Meaney et al. | |
| 2011/0235990 A1 | 9/2011 | Anzures et al. | |
| 2011/0235998 A1 | 9/2011 | Pond et al. | |
| 2011/0276881 A1 | 11/2011 | Keng et al. | |

OTHER PUBLICATIONS

Agilent ADNK-2623 Optical Mouse Designer's Kit, "Product Overview," Agilent Technologies pp. 1-4, Jul. 3, 2003.

Agilent ADNS-2620 Optical Mouse Sensor, "Data Sheet," Agilent Technologies, pp. 1-27, May 13, 2005.

Agilent ADNB-6031 and ADNB-6032 Low Power Laser Mouse Bundles, "Data Sheet," Agilent Technologies, pp. 1-44, Apr. 21, 2006.

HeadMouse Extreme, Prentke Romich Company, p. 1, Feb. 10, 2008: <http://store.prentrom.com/cgi-bin/store/HE-X.html>.

HiBall-3100 Wide-Area Tracker and 3D Digitizer, 3rdTech, pp. 1 and 2, 2006.

LCD Topgun User Manual, pp. 1-4, Sep. 26, 2006: <http://www.hkems.com/m_main.htm>.

RGT Tracking, eReal Games, pp. 1-9, Sep. 26, 2006: <http://www.erealgames.com/aboutrgt.php>.

SpaceMouse Plus, 3D Connexion, pp. 1 and 2, 2006.

Wii Remote, pp. 1-4, Sep. 26, 2006: <http://wii.nintendo.com/controllers.html>.

F. Madritsch, "CCD-Camera Based Optical Tracking for Human-Computer Interaction," Proceedings 1st European Conference on Disability, Virtual Reality and Associated Technologies, Maidenhead, pp. 161-170 (1996).

B. A. Myers et al., "Interacting at a Distance: Measuring the Performance of Laser Pointers and Other Devices," Proceedings of CHI'2002: Human factors in computing systems, pp. 33-40 (2002).

D. R. Olsen, et al., "Laser pointer interactions," Proceedings of the SIGCHI conference on Human factors in computing systems, pp. 17-22 (2001).

R. Sukthankar, et al., "Smarter Presentations: Exploiting homography in camera-projector systems," Proceedings of International Conference on Computer Vision, 2001.

* cited by examiner

FIG. 8 ant
3D REMOTE CONTROL SYSTEM EMPLOYING ABSOLUTE AND RELATIVE POSITION DETECTION This application is a continuation of U.S. patent application Ser. No. 11/594,342 filed on Nov. 7, 2006 (now U.S. Pat. No. 8,291,346), which is incorporated herein by reference in its entirety.

FIELD OF THE INVENTION

The present invention can relate to multi-dimensional remote control systems.

BACKGROUND OF THE INVENTION

Some electronic systems can permit a user to interact with software applications, e.g., video games, by manipulating a remote control. For example, the systems can permit a user to interact with an image shown on a display by pointing a remote control at desired locations on or proximate to the display. Using infrared (IR) sources and photodetectors, the remote control systems can detect light produced or reflected by the light sources. The systems then can determine the location to which the remote control is pointing based on the detected light. The remote control systems or electronic devices coupled thereto can then perform one or more predetermined actions.

SUMMARY OF THE INVENTION

The present invention can include multi-dimensional (e.g., 2-D or 3-D) remote control systems that can detect an absolute location to which a remote control is pointing in first and second orthogonal axes (e.g., the x- and y-axes). Remote control systems of the present invention also can detect the absolute position of the remote control in a third orthogonal axis (e.g., the z-axis).

To determine the absolute position of the remote control, remote control systems of the present invention can employ absolute position detection with relative position detection. Absolute position detection can indicate an initial absolute position of the remote control. Relative position detection can indicate changes in the position of the remote control. When the initial absolute position is combined with a change in the position of the remote control, an updated absolute position can be determined. Because relative position detection can provide greater resolution than some techniques used in absolute position detection, the updated absolute position can be more precise than the initial absolute position determined for the remote control.

The remote control system of the present invention also can zoom into and out of an image or a portion thereof based on the absolute position of the remote control in the third axis.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

The present invention can incorporate a three-dimensional remote control system that can detect an absolute location to which a remote control is pointing in x- and y-axes and can detect the absolute position of the remote control in the z-axis with respect to one or more reference locations. The remote control system of the present invention can employ absolute position detection with relative position detection.

Figure 1:
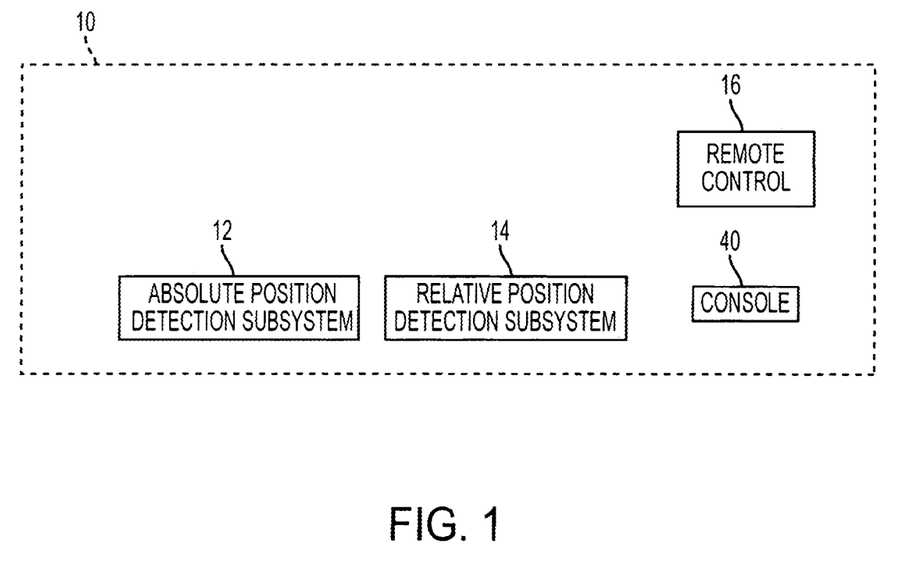
FIG. 1 illustrates one embodiment of a remote control system of the present invention.
Figure 2:
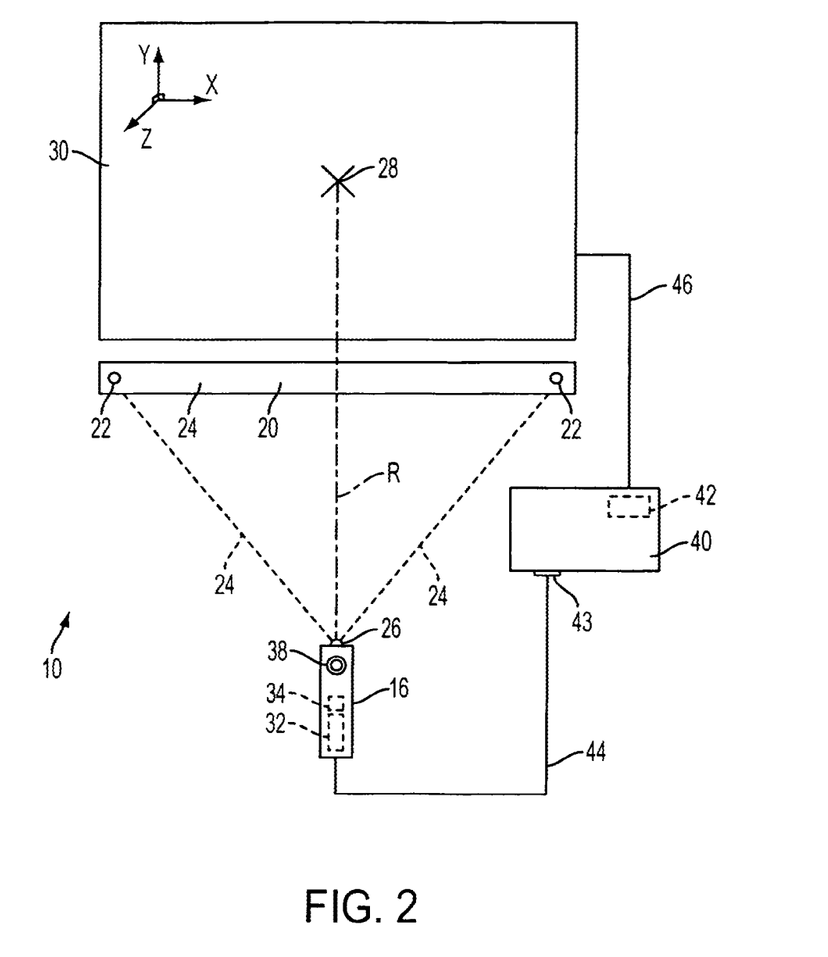
FIG. 2 illustrates interaction of one embodiment of a remote control system of the present invention with an image shown on a display.

FIGS. 1 and 2 illustrate one embodiment of remote control system 10 of the present invention. Remote control system 10 can include remote control 16, absolute position detection sub-system 12, and relative position detection sub-system 14. Remote control system 10 can permit a user to interact with an image shown on display 30 using remote control 16. Display 30 can show an image substantially defined by orthogonal x- and y-axes. Display 30 can have any shape or configuration. For example, display 30 can be a television, a computer monitor, a surface upon which images are projected, or any combination thereof. The display can have a flat screen or a screen with a nominal curvature. The display also can be any other type of display known in the art or otherwise.

Remote control system 10 can permit a user to move object 28 (e.g., a cursor) displayed on display 30 in the x- and y-axes by pointing remote control 16 at desired locations on display 30. Ray R in FIG. 2 can indicate the location at which remote control 16 is pointing. Remote control system 10 can determine the absolute x- and y-positions of the location to which the remote control is pointing (relative to one or more reference locations). Remote control system 10 then can move object 28 to the location to which the remote control is pointing. Thus, when the user moves remote control 16 in the x- and y-axes, display 30 can show a corresponding movement of object 28 in the x- and y-axes.

Remote control system 10 also can permit a user to control other parameters of the image show on display 30 (e.g., size of object 28) by moving remote control 16 in a z-axis that may be orthogonal to the x- and y-axes. Remote control system 10 can determine the absolute position of remote control 16 in the z-axis with respect to a reference location and correlate one or more parameters of the image thereto. Thus, for example, as a user moves remote control 16 towards or away from display 30 in the z-axis, remote control system 10 can enlarge or reduce at least a portion of the image shown on display 30 (e.g., the size of object 28). In one embodiment of the present invention, the reference location in the z-axis may be substantially co-planar with a screen of display 30 on which an image is shown. As used herein, the position of the remote control in the x-, y- and z-axes also may be referred to as the x-, y- and z-positions of the remote control (respectively).

Absolute position detection sub-system 12 can detect one or more of the following absolute positions with respect to one or more reference locations: (1) the x- and y-positions of remote control 16; (2) the x- and y-positions of the location on or proximate to display 30 to which the remote control is pointing; and (3) the z-position of remote control 16. Relative position detection sub-system 14 can detect changes in the position of remote control 16 as the user manipulates the remote control. For example, relative position detection sub-system 14 can detect the direction in which remote control 16 is moving and/or the speed at which remote control 16 is moving.

To detect the x-, y-, and z-positions, absolute position detection sub-system 12 can include one or more electro-optical components, e.g., one or more light sources and/or a photodetector. For example, as illustrated in FIG. 2, remote control system 10 can include a plurality of individual predetermined light sources 22. One or more predetermined light sources 22 can be disposed on frame 24 to form light transmitter 20 or integrated with display 30. One or more predetermined light sources 22 also can be disposed anywhere proximate to, on, or near display 30. As used herein, the predetermined light sources can either generate light or reflect light shined thereon. If predetermined light source(s) act as reflector(s), another light source can project light towards the reflector(s). The reflector(s) can reflect the light back to a photodetector. For example, the photodetector and the other light source can be disposed on remote control 16, whereas the reflector(s) can be disposed proximate to, near, on, or in display 30.

Predetermined light sources 22 can emit, e.g., infrared (IR) light 24 to remote control 16, which can detect the emitted light using photodetector 26. Photodetector 26 can include CCD arrays, CMOS arrays, two-dimensional position sensitive photodiode arrays, other types of photodiode arrays, other types of light detection devices known in the art or otherwise, or any combination thereof.

In one embodiment of the present invention, transmitter 20 can be disposed such that predetermined light sources 22 are substantially co-planar with the screen of display 30. In alternative embodiments of the present invention, transmitter 20 and/or predetermined light sources 22 can be disposed at another location near or on display 30. In one embodiment of the present invention, remote control system 10 can be configured to determine the absolute z-position of remote control 16 with respect to the light transmitter and/or one or more predetermined light sources. That is, the light transmitter and/or one or more predetermined light sources may serve as the reference location in the z-axis. One of the predetermined light sources also may serve as the reference location in the x- and y-axes.

Controller 32, which may be disposed within remote control 16, can determine the x- and y-positions of the display location to which a user is pointing remote control 16 based on the IR light detected by photodetector 26. Controller 32 also can be configured to generate signals for rendering display 30 that move object 28 to the determined x- and y-positions. Based on the IR light detected by photodetector 26, controller 32 also can be configured to determine an absolute z-position of remote control 16 with respect to a reference location. The controllers described herein may include processors, memory, ASICs, circuits and/or other electronic components.

Relative position detection system 14 can include relative motion sensor 34 disposed within remote control 16. Relative motion sensor 34 can include any sensor that can detect relative motion or change in position of an object to which it is coupled. Controller 32 can incorporate data from relative motion sensor 34 in calculating the absolute z-position of remote control 16. This can provide additional resolution of the determined z-position and can permit remote control system 10 to more accurately track movement of remote control 16.

In one embodiment of the present invention, relative motion sensor 34 can include a single or multi-dimensional accelerometer. In alternative embodiments of the present invention, relative motion sensor 34 can include a gyroscope, an accelerometer, any other sensor that can detect relative motion, or any combination thereof.

Remote control 12 can incorporate user input component 38. A user may actuate user input component 38 when the user wants remote control system 10 to perform an action. For example, a user my actuate user input component 38 when the user is pointing to a location on display 30 to which the user wants object 28 to be moved or when the user moves remote control 16 in the z-axis to, e.g., zoom in on or zoom out of the image shown on display 30. When the user is not actuating user input component 38, remote control system 10 can be configured to take no action.

User input component 38 can be a scrollwheel similar to that incorporated by a portable media player sold under the trademark iPod™ by Apple Computer, Inc. of Cupertino, Calif. The scrollwheel can include one or more buttons and a capacitive touchpad. The touchpad can permit a user to scroll through software menus by running the user's finger around the track of the scrollwheel. User input component 38 also can include, for example, one or more buttons, a touchpad, a touchscreen display, or any combination thereof.

Remote control system 10 also can include optional console 40. Console 40 can have controller 42 that can perform some or all of the processing described for controller 32. For example, remote control 16 can be configured to transmit data representing detected IR light 24 to console 40. Controller 42 in console 40 then can (1) determine the absolute x-, y-, and z-positions described above; and (2) generate signals for rendering display 30 based on the determined x-, y-, and z-positions.

Alternatively, controller 32 can determine the absolute x-, y-, and z-positions described above and controller 42 can generate signals for rendering display 30 based on the determined x-, y-, and z-positions.

In one embodiment of the present invention, console 40 can communicate with remote control 16 using cable 44 and/or one or more wireless communication protocols known in the art or otherwise. Console 40 also can communicate with display 30 using cable 46 and/or one or more wireless communication protocols known in the art or otherwise. Alternatively, console 40 can be integrated with display 30 as one unit.

Console 40 also can have one or more connectors 43 to which accessories can be coupled. Accessories can include cables 44 and/or 46, game cartridges, portable memory devices (e.g., memory cards, external hard drives, etc.), adapters for interfacing with another electronic device (e.g., computers, camcorders, cameras, media players, etc.), or combinations thereof.

Figure 3:
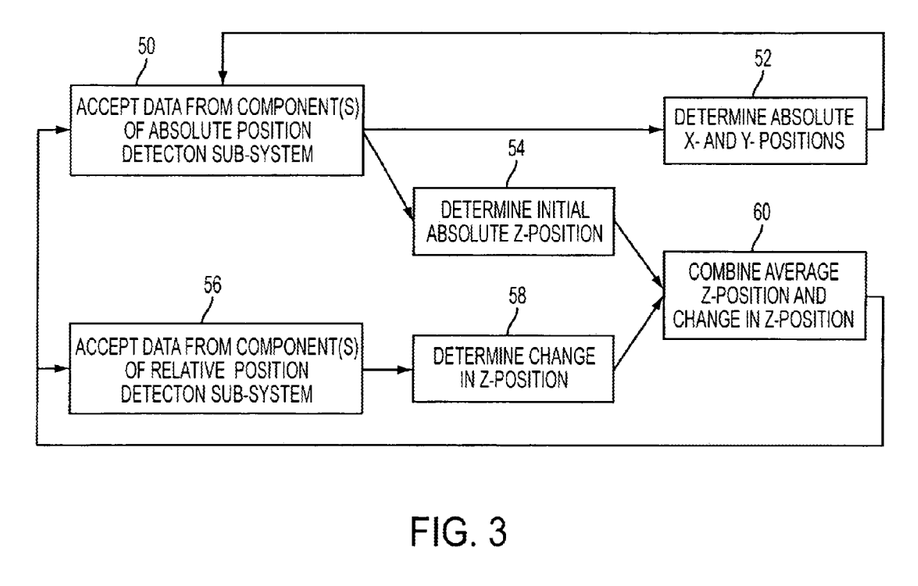
FIG. 3 illustrates a process for determining absolute positions of a remote control in x-, y-, and z-axes in accordance with one embodiment of the present invention.

FIG. 3 illustrates one embodiment of a position detection process in accordance with the present invention. In step 50, controller 32 or 42 can accept data from photodetector 26 of absolute position detection sub-system 12. The accepted data may be representative of detected light 24. In step 52, controller 32 or 42 can use the data from photodetector 26 to determine the absolute x- and y-positions of the location to which remote control 16 is pointing and/or the absolute x- and y-positions of remote control 16. The absolute x- and y-positions of remote control 16 can be used, for example, in video games to position a user's character or to otherwise track the movement of the remote control in a user's environment.

Techniques for determining the x- and y-positions may be known in the art. For example, U.S. Pat. No. 6,184,863 to Sibert et al., issued on Feb. 6, 2001, and U.S. Pat. No. 7,053,932 to Lin et al, issued on May 30, 2006, the entireties of which are incorporated herein by reference, describe two techniques that can be employed by controller 32 or 42. U.S. Patent Application Publication No. 2004/0207597 to Marks, published on Oct. 21, 2004; No. 2006/0152489 to Sweetser et al., published on Jul. 13, 2006; No. 2006/0152488 to Salsman et al., published on Jul. 13, 2006; and No. 2006/0152487 to Grunnet-Jepsen et al., published on Jul. 13, 2006, the entireties of which also are incorporated herein by reference, describe additional techniques that can be employed by controller 32 or 42. Remote control system 10 also can employ other techniques known in the art or otherwise.

In step 54, controller 32 or 42 can use the data from photodetector 26 to determine an initial absolute z-position of remote control 16 using, e.g., an averaging technique. One embodiment of an averaging technique can include accepting multiple frames of data collected by photodetector 26 and determining an average absolute z-position based on the multiple frames of data. More details about one embodiment of the averaging technique is discussed below with respect to FIGS. 4-5B.

In step 56, controller 32 or 42 can accept data or signals from accelerometer 34. Based on the accelerometer data/signals, controller 32 or 42 can extract information about changes in the z-position of remote control 16 (if any). For example, the sign of the slope of a signal waveform derived from accelerometer data can indicate whether a user is moving remote control 16 in the positive or negative z-direction with respect to a reference condition. The magnitude of signals derived from accelerometer data can indicate the rate at which the user is moving remote control 16. The controller can extract this information from the accelerometer signals and correlate the information to the direction and rate of change of remote control 16 in the z-axis. Given the direction, rate of change, and amount of time elapsed, controller 32 or 42 can determine changes in the position of remote control 16 in the z-axis.

In step 60, controller 32 or 42 can combine the average absolute z-position determined in step 54 with the change in z-position determined in step 58 to provide an updated absolute z-position. For example, controller 32 or 42 can add the average absolute z-position determined in step 54 with the change in z-position determined in step 58. Controller 32 or 42 also can weight either the average absolute z-position determined in step 54 or the change in z-position determined in step 58 before combining the values, e.g., to account for differences in accuracy, error rates, characteristics of the hardware, etc.

The value resulting from the combination can be a more precise indication of the absolute z-position of remote control 16 as compared to the average z-position determined in step 54. The updated z-position determined in step 60 can provide additional resolution and thereby permit remote control system 10 to more accurately track movement of remote control 16.

Controller 32 or 42 can be configured to perform steps 50-54 simultaneously with steps 56-60. The controller also can continuously reiterate steps 50-60, thereby continuously updating the absolute z-position of remote control 16.

In the embodiment of FIG. 3, remote control system 10 can perform additional processing. For example, data from photodetector 26 can be processed by a hardware or software low pass filter (not shown). Also, data from accelerometer 34 can be processed by a hardware or software high pass filter (not shown). Controller 32 or 42 also can use data from relative motion sensor 34 to determine roll of remote control 16. For example, if a remote control system employs a symmetrical pattern of IR emitters, the controller can not be able to distinguish whether the remote control is disposed with, e.g., user input component 38 pointing in the positive y-direction or in the negative y-direction due to the symmetricity. By incorporating an accelerometer, for example, a controller of the present invention can distinguish between these configurations by analyzing accelerometer data. Controller 32 or 42 also can use data from the relative motion sensor to determine pitch and yaw of remote control 16 with respect to a reference configuration.

While FIG. 3 shows a remote control system of the present invention using data from the relative position detection sub-system to determine only the changes in the absolute z-position of a remote control, data from the relative position detection sub-system also can be used to determine changes in the x- and y-positions of the remote control. This information then can be combined with the x- and y-positions determined in step 52 to determine the location to which the remote control is pointing and/or the absolute x- and y-positions of remote control 10.

Figure 4:
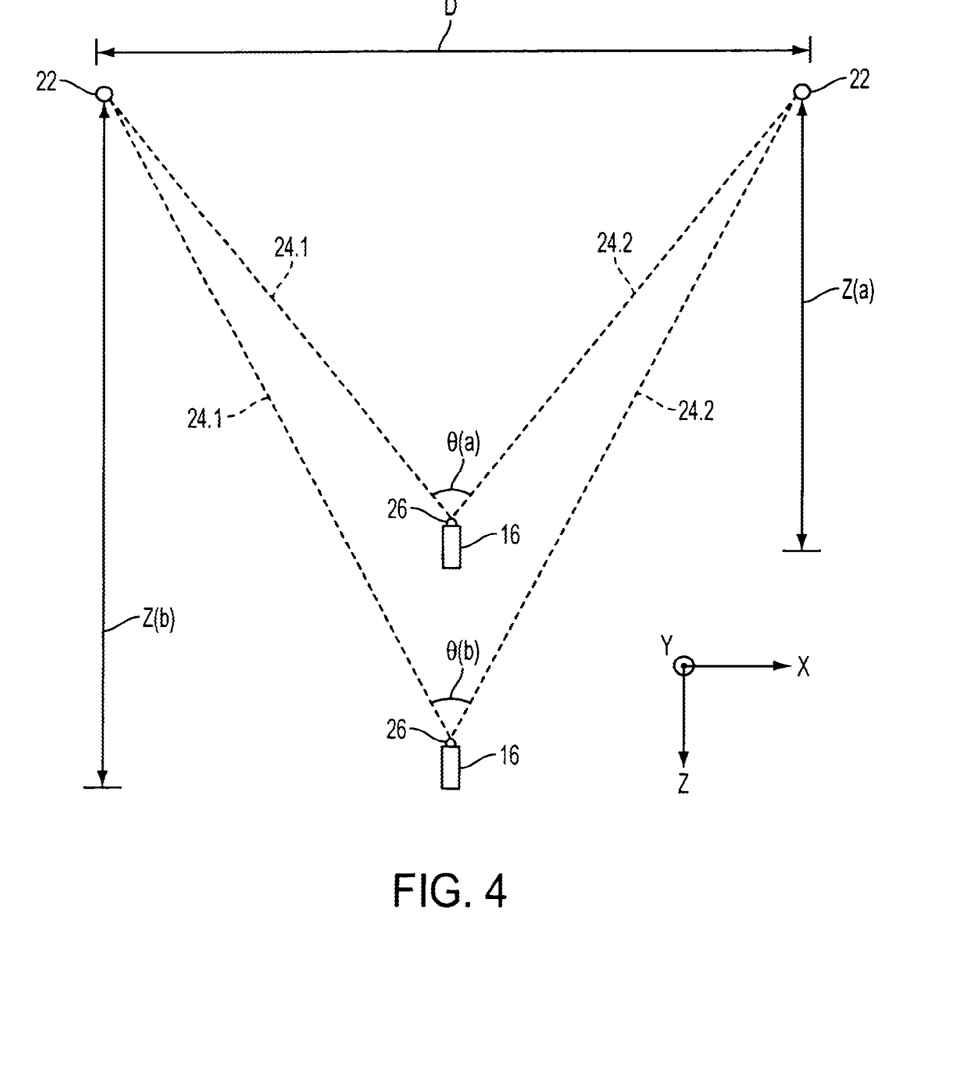
FIG. 4 illustrates a process for determining an absolute position of a remote control in the z-axis in accordance with one embodiment of the present invention.

FIG. 4 illustrates techniques that absolute position detection sub-system 12 of remote control system 10 can employ in step 54 of FIG. 3 to determine an initial absolute z-position of remote control 16. Remote control system 10 can be configured to determine the absolute position of a remote control in the z-direction by analyzing light signals 24.1, 24.2 from at least two predetermined light sources 22 to determine perceived distance D between the predetermined light sources. For example, as a user moves remote control 16 from position Z(a) to Z(b), angle Θ between light rays 24.1 and 24.2 may decrease from Θ(a) to Θ(b). As a result, remote control 16 can perceive distance D between predetermined light sources 22 to become smaller. Accordingly, to determine the absolute z-position of remote control 16 with respect to, e.g., predetermined light sources 22, controller 32 or 42 can correlate angle Θ and/or perceived distance D to a z-position. For example, controller 32 or 42 can calculate the z-position using angle Θ and/or perceived distance D in one or more formulas based on principles of geometry. Alternatively, remote control system 10 can have a database that associates perceived distances D and/or angles Θ to predetermined z-positions. Controller 32 or 42 can be configured to access this database to determine the z-position of remote control 16.

Remote control system 10 also can compare the signal intensities of light rays 24.1 and 24.2 received by photodetector 26 to determine the absolute z-position of remote control 16. For example, as a user moves remote control 16 from position Z(a) to Z(b), the intensities of light rays 24.1 and 24.2 received by photodetector 26 may decrease. Also, as a user moves remote control 16 from side to side in the x-axis, the intensity of light 24.1 received by photodetector 26 may differ from that received from light 24.2. To determine the absolute z-position of remote control 16, controller 32 or 42 can correlate the detected intensities of light rays 24.1 and 24.2 to a z-position for the remote control. For example, controller 32 or 42 can be configured to calculate the z-position using formula(s) that are function(s) of the intensities of the detected light rays. The formulas can be determined by empirical testing or by using principles of light propagation.

Alternatively, remote control system 10 can have a database that associates detected intensities to predetermined z-positions. Controller 32 or 42 can be configured to access this database to determine the z-position of remote control 16. In one embodiment of the present invention, controller 32 or 42 can correlate the z-position of remote control 16 using perceived distance D, angle Θ, intensities of light detected by photodetector 26, or any combination thereof. While FIG. 4 illustrates an exemplary system having two predetermined light sources, these techniques can be employed to detect an absolute z-position of remote control 16 in systems having more than two predetermined light sources.

Remote control system 10 also can employ other techniques known in the art or otherwise for determining initial absolute z-positions of remote control 16. For example, U.S. Patent Application Publication Nos. 2006/0152489 to Sweetser et al.; 2006/0152488 to Salsman et al.; and 2006/0152487 to Grunnet-Jepsen et al., the entireties of which are incorporated herein by reference above, describe techniques that can be employed by controller 32 or 42 to determine the z-position of a remote control when two, three, or four predetermined light sources are provided.

In one embodiment of the present invention, remote control system 10 can use only the techniques described above to determine the initial absolute z-position of remote control 16 in step 54 of FIG. 3. In an alternative embodiment of the present invention, remote control system 10 can employ additional processing in step 54 to determine an average z-position for remote control 16. That is, the initial absolute position determined in step 54 can be an average position of the remote control over a predetermined amount of time or predetermined number of frames of data collected by the photodetector. The latter embodiment can reduce the effect of jitter in the collected data. Jitter can result, for example, from decreased resolution in the z-direction when the distance between predetermined light sources 22 and photodetector 26 increases.

Figure 5A:
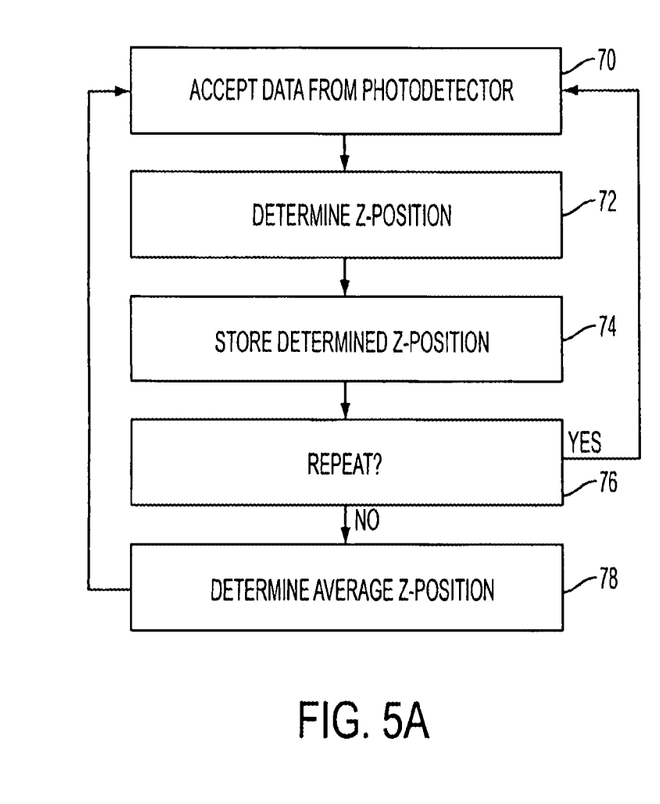
FIGS. 5A-5B illustrate alternative processes for determining an average absolute position of a remote control in the z-axis in accordance with one embodiment of the present invention.
Figure 5B:
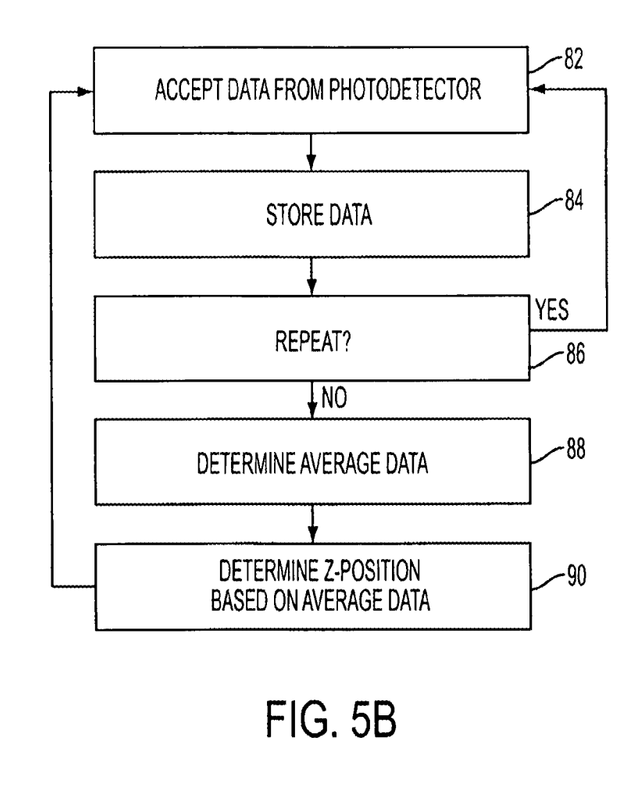

FIGS. 5A-5B illustrate averaging techniques for determining an average absolute z-position for remote control 16. Of course, remote control system 10 can use other averaging techniques known in the art or otherwise for determining an average absolute z-position for remote control 16.

In the embodiment of FIG. 5A, controller 32 or 42 can be configured to determine an absolute z-position for each frame of data collected by photodetector 26 and then average the determined z-positions over a predetermined number of frames (e.g., 30 frames). In step 70, controller 32 or 42 can accept data from photodetector 26 that may be representative of IR light 24 from predetermined light sources 22. Using the techniques described with respect to FIG. 4, for example, controller 32 or 42 can determine an absolute z-position of remote control 16 based on the accepted data (step 72). In step 74, controller 32 or 42 can store the z-position determined in step 72 in memory, e.g., buffer memory. In step 76, controller 32 or 42 can check whether z-positions have been determined for a predetermined number of frames. If not, the controller can revert back to step 70. In step 78, controller 32 or 42 can determine an average z-position for remote control 16 by averaging some or all of the z-positions stored in step 74. In one embodiment of the present invention, the controller can perform additional processing before the controller determines an average z-position. For example, the controller can eliminate extreme or outlying z-position values from the set of values used in the averaging process. Thereafter, controller 32 or 42 can revert back to step 70.

In the embodiment of FIG. 5B, controller 32 or 42 can be configured to average data collected from photodetector 26 over a predetermined number of frames (e.g., 30 frames) and then determine a z-position based on the averaged data. In step 82, controller 32 or 42 can accept data from photodetector 26 that may be representative of IR light 24 from predetermined light sources 22. In step 84, controller 32 or 42 can store the accepted data in memory, e.g., buffer memory. In step 86, controller 32 or 42 can check whether data from photodetector 26 has been accepted for a predetermined number of frames. If not, the controller can revert back to step 82. In step 88, controller 32 or 42 can determine average value(s) of the stored data, e.g., average intensity for light ray 24.1 and average intensity for light ray 24.2. Using the techniques described with respect to FIG. 4, for example, controller 32 or 42 can determine the average absolute z-position of remote control 16 based on the average value(s) determined in step 88 (step 90). In one embodiment of the present invention, the controller can perform additional processing before the controller determines an average z-position in step 90. Thereafter, the process can revert back to step 82.

Figure 6A:
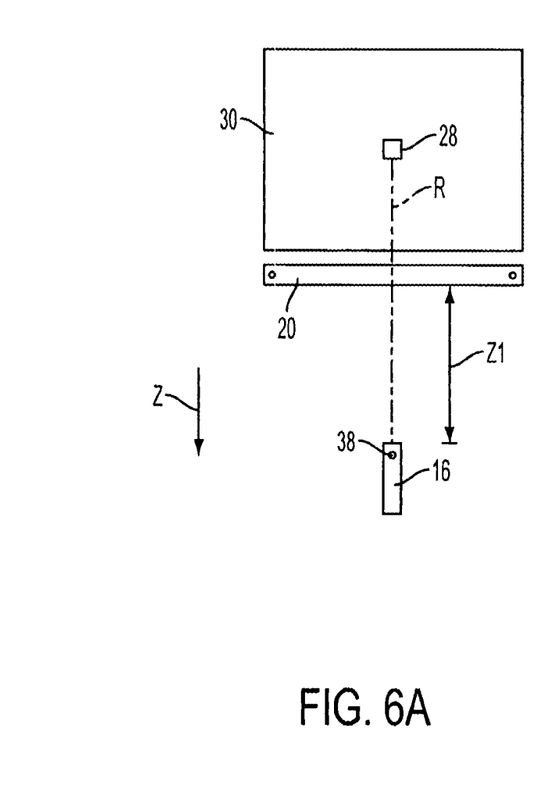
FIGS. 6A-6C and 7A-7C illustrate embodiments of a zooming feature of the present invention.
Figure 6B:
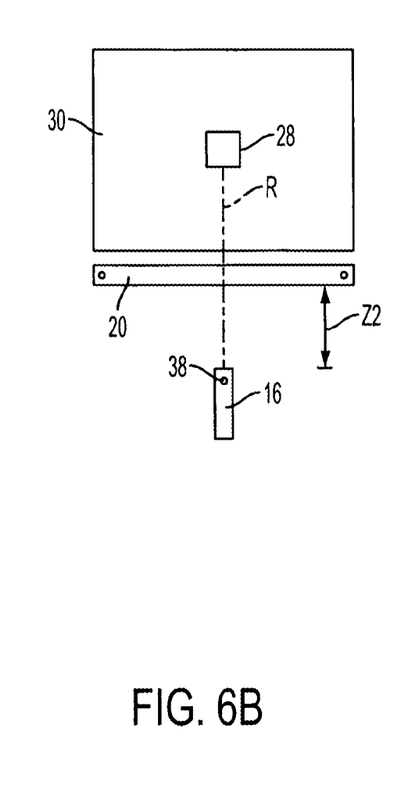
Figure 6C:
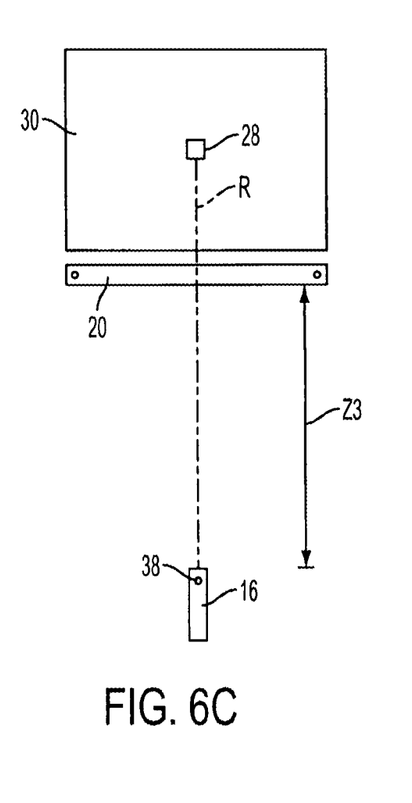

FIGS. 6A-6C illustrate one application of the present invention that can utilize the absolute z-position of remote control 16. In FIG. 6A, remote control 16 is positioned at position Z1 from light transmitter 20. Controller 32 or 42 can detect position Z1 and generate signals for rendering at least a portion of the image shown on the display (e.g., object 28) in a size that corresponds to position Z1. For example, the controller can scale an image of object 28 by a factor that correlates to position Z1 in a predetermined relationship. When a user moves remote control 16 closer to IR transmitter 20 as shown in FIG. 6B, the controller can detect new position Z2 and generate signals for rendering object 28 in a larger size that correlates to position Z2. When a user moves remote control 16 farther way from IR transmitter 20 as shown in FIG. 6C, the controller can detect new position Z3 and generate signals for rendering at least a portion of the image shown on the display (e.g., object 28) in a smaller size that correlates to position Z3. Thus, the image of object 28 may have a reference size that may be scaled up or down depending on the position of remote control 16 in the z-axis.

In an alternative embodiment of the present invention, controller 32 or 42 can enlarge or zoom in on at least a portion of an image shown on the display (e.g., object 28) when the remote control is moved away from the display or transmitter 20 in the z-axis. Controller 32 or 42 also can reduce the size or zoom out of at least a portion of the image shown on the display (e.g., object 28) when the remote control is moved towards the display or transmitter 20 in the z-axis.

Figure 7A:
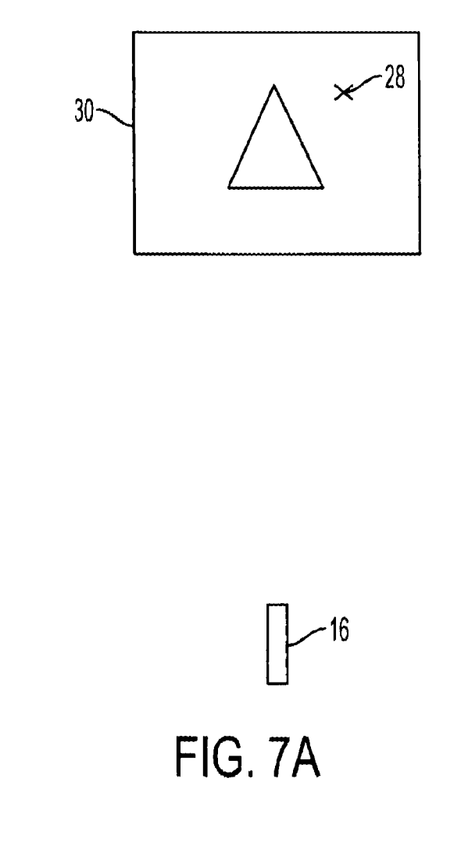
Figure 7B:
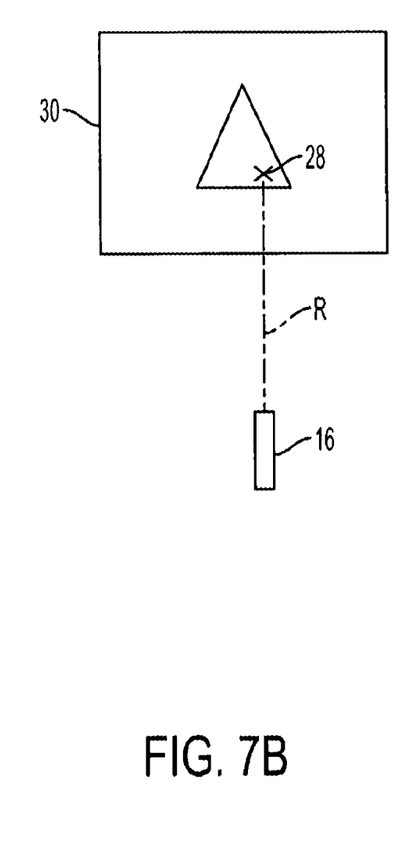
Figure 7C:
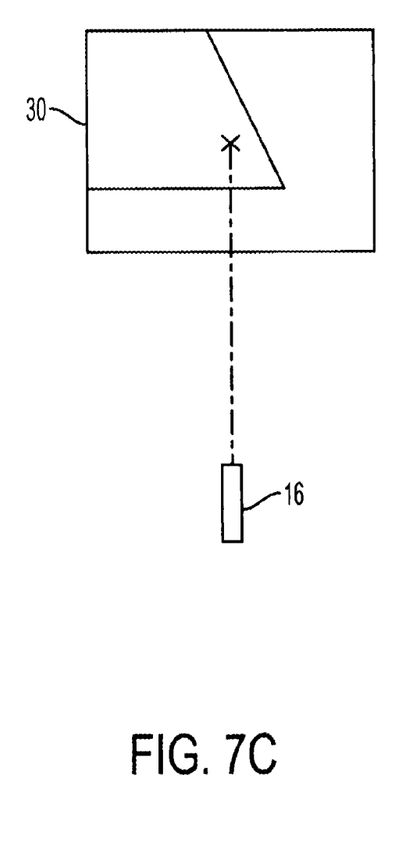

FIGS. 7A-7C illustrate a second application that uses the zooming function described with respect to FIGS. 6A-6C to zoom into and out of at least a portion an image (e.g., pictures or videos) shown on display 30. FIG. 7A illustrates display 30 showing an image of a triangle and cursor 28. When a user wishes to zoom into or enlarge a particular area of the triangle, the user can point remote control 16 to the desired area on the display (e.g., a corner of the triangle). Responsive thereto, remote control system 10 can detect this action and move cursor 28 to the location at which the remote control is pointed (see FIG. 7B). When the user moves the remote control closer to display 30 or transmitter 20 in the z-axis, remote control system 10 can zoom in on or enlarge the corner of the triangle at which cursor 28 is disposed (see FIG. 7C). Accordingly, the location in the x- and y-axes at which remote control 16 is pointing may be the focal point about which the image is zoomed in or out. Alternatively, remote control system 10 can be configured to zoom out or shrink an image shown on the display when the user moves the remote control closer to display 30 or transmitter 20 in the z-axis.

Figure 8:
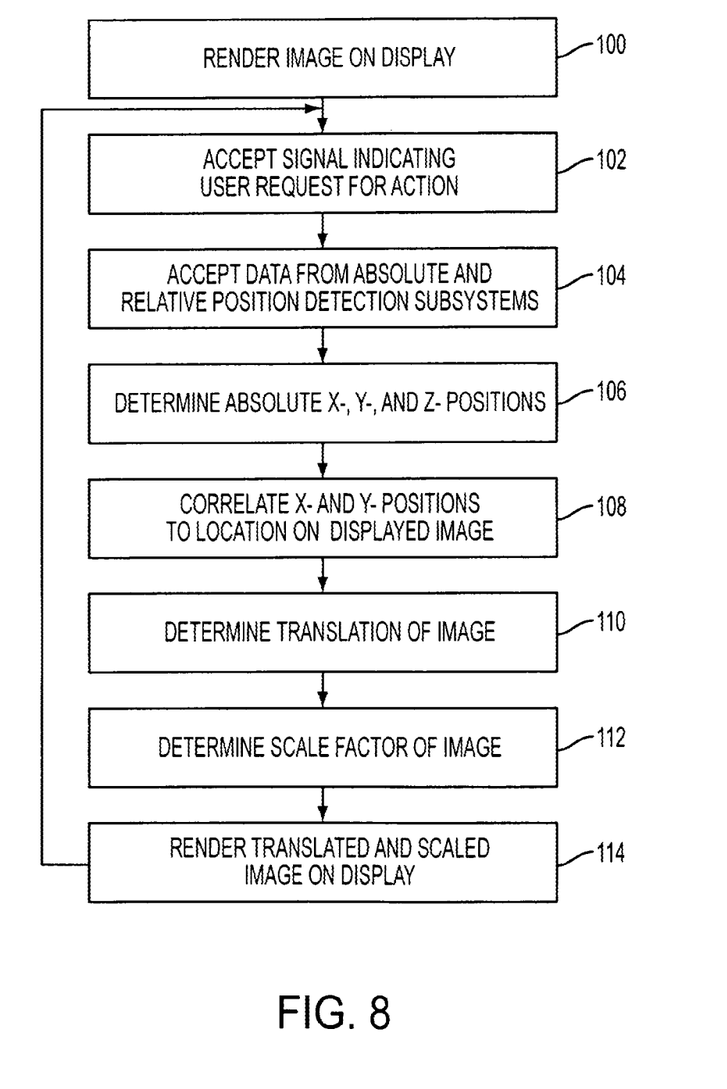
FIG. 8 illustrates one embodiment of the present invention for performing the zoom function described with respect to FIGS. 7A-7C.

FIG. 8 illustrates one embodiment of the present invention for performing the zoom function described with respect to FIGS. 7A-7C. In step 100, controller 32 or 42 can generate signals to render an image on display 30. Controller 32 or 42 initially can render the image in a reference size. In step 102, the controller can accept signals from user input component 38 that indicates the user is requesting that remote control system 10 take action. In step 104, the controller can accept data from absolute and relative position detection sub-systems as described above. In step 106, the controller can determine the absolute x- and y-positions to which remote control 16 is pointing and the z-position of the remote control. In step 108, the controller can correlate the x- and y-positions to which remote control 16 is pointing to coordinates on the displayed image.

In step 110, the controller can determine how much the displayed image needs to be translated in the x- and y-directions so that the resulting image rendered in step 114 shows the desired feature at which the remote control is pointed. For example, the image rendered in step 114 can be centered about the location in the x- and y-axes to which the remote control is pointing.

In step 112, the controller can determine how much to scale the displayed image from its reference size in accordance with the z-position of remote control 16. In step 114, the controller can generate signals for rendering display 30 with an image that is translated and scaled in accordance with the translation and scaling factor determined in steps 110 and 112.

Although particular embodiments of the present invention have been described above in detail, it will be understood that this description is merely for purposes of illustration. Alternative embodiments of those described hereinabove also are within the scope of the present invention. For example, predetermined light sources can be disposed in a remote control and a photodetector can be disposed in a display, in a frame disposed proximate to the display, or at any location proximate to, on, or near a display.

Also, a controller in the display can perform some or all of the processing described above for controllers 32 and/or 42. Thus, multiple controllers may be used to control remote control systems of the present invention.

A remote control of the present invention can be any electronic device in a system that may need to determine the absolute positions of the electronic device with respect to one or more reference locations. For example, the remote control can be any portable, mobile, hand-held, or miniature consumer electronic device. Illustrative electronic devices can include, but are not limited to, music players, video players, still image players, game players, other media players, music recorders, video recorders, cameras, other media recorders, radios, medical equipment, calculators, cellular phones, other wireless communication devices, personal digital assistances, programmable remote controls, pagers, laptop computers, printers, or combinations thereof. Miniature electronic devices may have a form factor that is smaller than that of hand-held devices. Illustrative miniature electronic devices can include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof.

While the above description may have described certain components as being physically separate from other components, one or more of the components may be integrated into one unit. For example, photodetector 26 may be integrated with relative motion sensor 34. Controller 32 also may be integrated with photodetector 26 and relative motion sensor 34. Furthermore, the absolute and relative position detection sub-systems can share components, e.g., controller 32.

Furthermore, while the illustrative remote control systems described above may have included predetermined light sources that output light waves, one or more of the predetermined light sources can be replaced with component(s) that output or reflect other types of energy waves either alone or in conjunction with light waves. For example, the component(s) can output radio waves.

The above described embodiments of the present invention are presented for purposes of illustration and not of limitation, and the present invention is limited only by the claims which follow.

What is claimed is:

1. A system coupled to a display, the system comprising:
   at least one predetermined light source;
   a photodetector that detects light from the at least one predetermined light source;
   a remote control having a relative motion sensor; and
   at least one controller configured to:
      detect an initial absolute position of the remote control in a first axis based on the light detected by the photodetector;
      generate signals for rendering at least a portion of an initial image defined by second and third orthogonal axes on the display, wherein the first axis is orthogonal to the second and third axes, and wherein the initial image is scaled to an initial size corresponding to the initial absolute position;
      detect an updated absolute position of the remote control in the first axis based on a change in position of the remote control detected by the relative motion sensor and based on the initial absolute position;
      scale the initial image to a new size corresponding to the updated absolute position; and
      generate signals for rendering at least a portion of the scaled image on the display.

2. The system of claim 1, wherein the relative motion sensor comprises an accelerometer.

3. The system of claim 1, wherein the initial absolute position and the updated absolute position are detected with respect to a reference location.

4. The system of claim 3, wherein the reference location is one of the display and the photodetector.

5. The system of claim 3, wherein the at least one controller is operative to:
   detect that the updated absolute position of the remote control is closer to the reference location than the initial absolute position is to the reference location; and
   scale the image to a larger size corresponding to the updated absolute position.

6. The system of claim 3, wherein the at least controller is operative to:
   detect that the updated absolute position of the remote control is further way from the reference location than the initial absolute position is from the reference location; and
   scale the image to a smaller size corresponding to the updated absolute position.

7. A remote control operative for use with a display, at least one predetermined light source, and a photodetector that detects light from the at least one predetermined light source, the remote control comprising:

an absolute position detection component operative to detect an initial absolute position of the remote control in a third axis based on the light detected by the photodetector;

a relative motion sensor operative to detect a change in a position of the remote control; and a controller in communication with the absolute position detection component and the relative motion sensor, wherein the controller is operative to:

generate signals for rendering at least a portion of an initial image defined by first and second orthogonal axes on the display, wherein the initial image is scaled to an initial size corresponding to the initial absolute position;

detect an updated absolute position of the remote control in the third axis based on the initial absolute position and based on a change in position of the remote control detected by the relative motion sensor, wherein the third axis is orthogonal to the first and second axes; and transmit signals operative to scale the initial image to a new size on the display corresponding to the updated absolute position of the remote control in the third axis.

8. The remote control of claim 7, wherein:
the controller is further operative to detect that the remote control is pointing at a particular location on the display based on at least one of data from the absolute position detection component comprising the initial absolute position of the remote control and data from the relative motion sensor; and
the transmitted signals are operative to move a cursor on the display to the particular location.

9. The remote control of claim 7, wherein:
the controller is further operative to detect that the remote control is pointing at a particular location on the display based on at least one of data from the absolute position detection component comprising the initial absolute position of the remote control and data from the relative motion sensor; and
the particular location is a focal point about which the portion of the image is operative to be changed by the transmitted signals.

10. The remote control of claim 7, wherein:
the controller is further operative to detect that the remote control is pointing at a particular location on the display based on at least one of data from the absolute position detection component comprising the initial absolute position of the remote control and data from the relative motion sensor; and
the initial absolute position of the remote control comprises an initial absolute position of the remote control in the third axis.

11. The remote control of claim 10, wherein the controller is operative to:
detect that the updated absolute position of the remote control in the third axis is closer to a reference location than the initial absolute position of the remote control in the third axis; and
transmit the signals to the display to at least one of zoom in on and enlarge the portion of the image corresponding to the particular location.

12. The remote control of claim 10, wherein the controller is operative to:
detect that the updated absolute position of the remote control in the third axis is further from a reference location than the initial absolute position of the remote control in the third axis is to the reference location; and
transmit the signals operative to at least one of zoom out of and shrink the portion of the image corresponding to the particular location.

13. A method for use with a system comprising at least one predetermined light source, a photodetector that detects light from the at least one predetermined light source, a remote control with a relative motion sensor, and a display, the method comprising:

rendering at least a portion of an initial image defined by first and second orthogonal axes on the display;

determining an initial absolute position of the remote control in a third axis based on the light detected by the photodetector, wherein the third axis is orthogonal to the first and second axes, and wherein the initial image is scaled to an initial size corresponding to the initial absolute position;

determining an updated absolute position of the remote control in the third axis based on the initial absolute position and the data based on a change in position of the remote control detected by the relative motion sensor;

determining a scale factor for changing the rendered image to a new size based on the updated absolute position in the third axis;

changing the rendered image from the initial size to the new size by the scale factor; and rendering at least a portion of the changed image on the display.

14. The method of claim 13, wherein the updated absolute position further comprises updated absolute positions in the first and second axes.

15. The method of claim 14, further comprising correlating the updated absolute positions in the first and second axes with coordinates on the rendered image.

16. The method of claim 15, further comprising determining a portion of the rendered image to translate based on the coordinates on the rendered image.

17. The method of claim 16, wherein the determining the portion of the rendered image to translate further comprises determining a first amount of the rendered image to translate in a first direction corresponding to the first axis and a second amount of the rendered image to translate in a second direction corresponding to the second axis.

18. The method of claim 16, wherein the determining the portion of the rendered image to translate further comprises generating a translation factor.

19. The method of claim 15, wherein the changed image is centered about the coordinates on the rendered image.

20. The method of claim 16, wherein the changing the rendered image further comprises translating the portion of the rendered image.

* * * * *

UNITED STATES PATENT AND TRADEMARK OFFICE
CERTIFICATE OF CORRECTION

| | | |
|---|---|---|
| PATENT NO. | : 8,689,145 B2 | Page 1 of 1 |
| APPLICATION NO. | : 13/647088 | |
| DATED | : April 1, 2014 | |
| INVENTOR(S) | : Duncan Robert Kerr et al. | |

It is certified that error appears in the above-identified patent and that said Letters Patent is hereby corrected as shown below:

Title Page (56), under "OTHER PUBLICATIONS", Line 1, delete "U.S. Appl." and insert -- U.S. Provisional Appl. --, therefor.

Claims

In Column 12, Claim 13, Line 27, delete "and the data based" and insert -- and based --, therefor.

Signed and Sealed this
Twelfth Day of January, 2016

Michelle K. Lee
*Director of the United States Patent and Trademark Office*